US008719330B2

(12) United States Patent
Gregson

(10) Patent No.: US 8,719,330 B2
(45) Date of Patent: May 6, 2014

(54) TERMINAL APPARATUS AND ELECTRONIC EQUIPMENT COMMUNICABLE WITH MEDIA CONTENT PROVIDING SERVER AND MEDIA CONTENT STORAGE SITES, AND A NON-TRANSITORY MEDIUM STORING A PROGRAM THEREFOR

(75) Inventor: Gary Gregson, London (GB)

(73) Assignee: Yamaha Corporation (JP)

( * ) Notice: Subject to any disclaimer, the term of this patent is extended or adjusted under 35 U.S.C. 154(b) by 447 days.

(21) Appl. No.: 13/077,237

(22) Filed: Mar. 31, 2011

(65) Prior Publication Data

US 2011/0246619 A1 Oct. 6, 2011

(30) Foreign Application Priority Data

Mar. 31, 2010 (JP) ................................. 2010-080309

(51) Int. Cl.
*G06F 15/16* (2006.01)

(52) U.S. Cl.
USPC ............................ 709/201; 709/203; 709/204

(58) Field of Classification Search
None
See application file for complete search history.

(56) References Cited

U.S. PATENT DOCUMENTS

2003/0014262 A1* 1/2003 Kim .............................. 704/278
2003/0115349 A1* 6/2003 Brinkman et al. ............ 709/231
2003/0177889 A1* 9/2003 Koseki et al. ................... 84/609
2008/0163746 A1* 7/2008 Ueki ............................... 84/626

FOREIGN PATENT DOCUMENTS

JP 2006-126240 A 5/2006

* cited by examiner

*Primary Examiner* — Djenane Bayard
(74) *Attorney, Agent, or Firm* — Rossi, Kimms & McDowell LLP

(57) ABSTRACT

There are provided a terminal apparatus by which media content relating to a connected electronic equipment can be easily acquired, an electronic equipment which can easily acquire media content relating to the electronic equipment itself, and a program. When a user actually operates an electronic music instrument and changes an operation state, a media content providing server receives state data indicating the operation state after the change from the electronic music instrument through a client terminal, receives a list of media content relating to the electronic music instrument and coincident with a present operation state of the electronic music instrument among a lot of stored media content from many media content storage servers on a communication network based on the state data, and displays it on a display of the client terminal. When the user selects one of media content from the list and instructs acquisition thereof, the media content providing server acquires corresponding media content data from a media content storage server storing it and transmits it to the client terminal.

4 Claims, 6 Drawing Sheets

WHEN CLIENT TERMINAL COMMUNICATES WITH SERVER

WHEN ELECTRONIC EQUIPMENT
(ELECTRONIC MUSIC INSTRUMENT)
COMMUNICATES WITH SERVER

TERMINAL APPARATUS AND ELECTRONIC EQUIPMENT COMMUNICABLE WITH MEDIA CONTENT PROVIDING SERVER AND MEDIA CONTENT STORAGE SITES, AND A NON-TRANSITORY MEDIUM STORING A PROGRAM THEREFOR

BACKGROUND OF THE INVENTION

1. Field of the Invention

The present invention relates to a terminal apparatus to which an electronic equipment is connected and which acquires media content relating to the connected electronic equipment, an electronic equipment to acquire media content relating to the electronic equipment itself, and a program.

2. Description of the Related Art

Hitherto, an electronic equipment is known which acquires media content relating to the electronic equipment itself, for example, an instruction manual (electronic manual) provided as electronic data, such as a PDF (portable document format) file, and displays it on a display device.

As such an electronic equipment, there is one in which correspondence information between each operation unit provided in the equipment and a page including a description relating to the operation unit in the acquired electronic manual is stored, and when a user operates an operation unit, reference is made to the correspondence information, and a display page of the electronic manual is changed to the page including the description relating to the operation unit (see, for example, patent document 1).

[Patent document 1] JP-A-2006-126240

However, in the related art electronic equipment, since the electronic manual is provided by a supplier (maker, dealer, etc.) of the electronic equipment, although the user can know the basic information provided by the supplier, the user can not know so-called UGC (user-generated content) such as impressions of users in the world actually using the electronic equipment, HowTo or Tips. In general, in order to obtain the UGC, it is necessary for the user himself/herself to access various media content information supply sites (servers), such as a video sharing site, a picture sharing site, an SNS (social network service) site, a blog site, and an electronic bulletin board relating to the electronic equipment, which are provided on the Internet, and to input a search condition for searching.

SUMMARY OF THE INVENTION

The invention is made in view of such circumstances, and it is an object of the invention to provide a terminal apparatus by which media content relating to a connected electronic equipment can be easily acquired, an electronic equipment which can easily acquire media content relating to the electronic equipment itself, and a program.

In order to achieve the object, according to a first aspect of the invention, a terminal apparatus includes first connection means for connecting with an electronic equipment, second connection means for connecting with a media content providing server through a communication network, first acquisition means for acquiring specific information to specify the electronic equipment from the electronic equipment, second acquisition means for acquiring state information indicating an operation state of the electronic equipment from the electronic equipment, third acquisition means for acquiring a list of media content which relates to the electronic equipment, is coincident with a present operation state of the electronic equipment, and is collected from plural media content storage sites existing on the communication network by the media content providing server in response to transmission of the specific information acquired by the first acquisition means and the state information acquired by the second acquisition means to the media content providing server, display means for displaying the list of the media content acquired by the third acquisition means on a display device, and fourth acquisition means for acquiring media content, which is instructed to be acquired by a user from the list of the media content displayed on the display device by the display means, from a site storing the media content among the plural media content storage sites.

According to a second aspect of the invention, an electronic equipment includes connection means for connecting with a media content providing server through a communication network, first acquisition means for acquiring a list of media content which relates to the electronic equipment itself, is coincident with a present operation state of the electronic equipment itself, and is collected from plural media content storage sites existing on the communication network by the media content providing server in response to transmission of specific information to specify the electronic equipment itself and state information indicating an operation state of the electronic equipment itself to the media content providing server, display means for displaying the list of the media content acquired by the first acquisition means on a display device, and second acquisition means for acquiring media content, which is instructed to be acquired by a user from the list of the media content displayed on the display device by the display means, from a site storing the media content among the plural media content storage sites.

According to a third aspect and a fourth aspect of the invention, a program can be realized based on the same technical concept as the first aspect and the second aspect of the invention.

According to the first aspect or the third aspect of the invention, the specific information to specify the electronic equipment is acquired from the electronic equipment connected by the first connection means, and the state information indicating the operation state of the electronic equipment is acquired from the connected electronic equipment. The list of the media content is acquired, which relates to the electronic equipment, is coincident with the present operation state of the electronic equipment, is collected from the plural media content storage sites existing on the communication network by the media content providing server in response to the transmission of the acquired specific information and the acquired state information to the media content providing server connected by the second connection means through the communication network. The acquired list of the media content is displayed on the display device, and the media content, which is instructed to be acquired by the user from the displayed list of the media content, is acquired from the site storing the media content among the plural media content storage sites. Accordingly, the user can easily acquire useful media content data during the operation of the electronic equipment.

According to the second aspect or the fourth aspect of the invention, the list of the media content is acquired, which relates to the electronic equipment itself, is coincident with the present operation state of the electronic equipment itself, is collected from the plural media content storage sites existing on the communication network by the media content providing server in response to the transmission of the specific information to specify the electronic equipment itself and the state information indicating the operation state of the electronic equipment itself to the media content providing server connected by the connection means through the communication network. The acquired list of the media content is displayed on the display device, and the media content, which is instructed to be acquired by the user from the displayed list of the media content, is acquired from the site storing the media content among the plural media content storage sites. Accordingly, the user can easily acquire the useful media content data during the operation of the electronic equipment.

DETAILED DESCRIPTION OF THE INVENTION

Hereinafter, embodiments of the invention will be described in detail with reference to the drawings.

Figure 1:
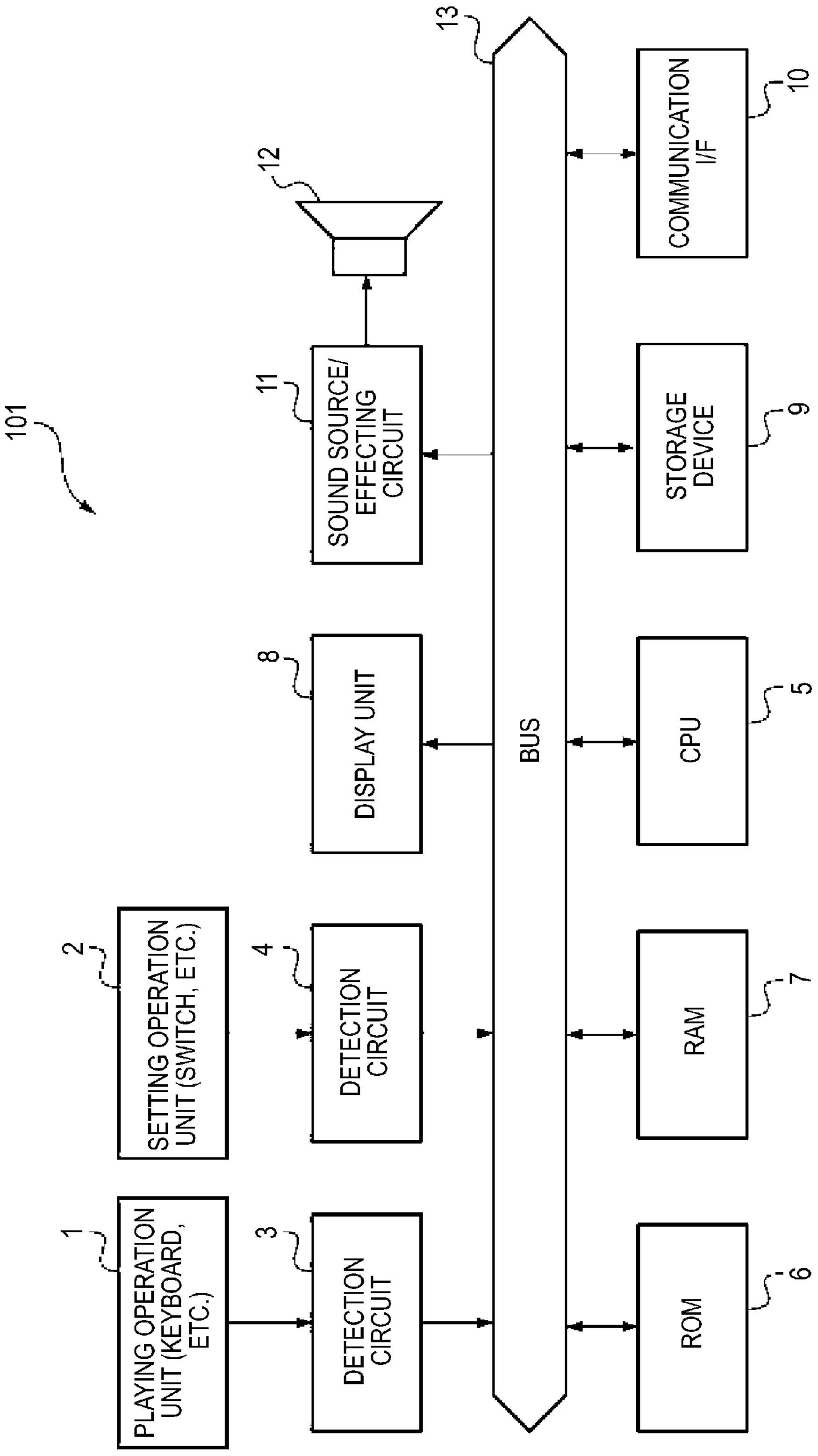
FIG. 1 is a block diagram showing a schematic structure of an electronic music instrument to which an electronic equipment connected to a terminal apparatus of a first embodiment of the invention is applied.

FIG. 1 is a block diagram showing a schematic structure of an electronic music instrument 101 to which an electronic equipment connected to a terminal apparatus (client terminal 102 described later with reference to FIG. 2) of a first embodiment of the invention is applied.

As shown in the drawing, the electronic music instrument 101 includes a playing operation unit 1 including a keyboard for inputting play information including pitch information, a setting operation unit 2 including plural switches, dials and wheels for inputting various information, a detection circuit 3 to detect an operation state of the playing operation unit 1, a detection circuit 4 to detect an operation state of the setting operation unit 2, a CPU 5 to control the entire instrument, a ROM 6 to store a control program executed by the CPU 5 and various table data, a RAM 7 to temporarily store play information, various input information and arithmetic operation results, a display unit 8 to display various information and including, for example, a small liquid crystal display (LCD) and a light-emitting diode (LED), a storage device 9 to store various application programs including the control program, various music data and various data, a communication interface (I/F) 10 to which the client terminal 102 is connected and through which data is transmitted to and received from the client terminal 102, a sound source/effecting circuit 11 to convert play information inputted by using the playing operation unit 1, or play information obtained by reproducing music data stored in the storage device 9 into a music signal, and to give various effects to the music signal, and a sound system 12 to convert the music signal from the sound source/effecting circuit 11 into a sound, such as, for example, a DAC (digital-to-analog converter), an amplifier and a speaker.

The above components 3 to 11 are mutually connected through a bus 13, and the sound system 12 is connected to the sound source/effecting circuit 11.

The storage device 9 includes a storage medium, such as, for example, a flexible disk (FD), a hard disk (HD), a CD-ROM, a DVD (digital versatile disk), a magneto-optical disk (MO) or a semiconductor memory, and a driving device thereof. The storage medium may be detachable from and attachable to the driving device, or the storage device 9 itself may be detachable from and attachable to the electronic music instrument 101. Alternatively, both the storage medium and the storage device 9 may be undetachable and unattachable. Incidentally, (the storage medium of) the storage device 9 can store also the control program executed by the CPU 5 as stated above. When the control program is not stored in the ROM 6, the control program is stored in the storage device 9, and is read into the RAM 7, so that the same operation as the case where the control program is stored in the ROM 6 can be performed by the CPU 5. By doing so, addition of the control program, aversion up thereof and the like can be easily performed.

As the communication I/F 10, for example, a music-only wired I/F to exclusively transmit and receive a music signal such as a MIDI (musical instrument digital interface) signal, a general-purpose near-distance wired I/F such as a USB (universal serial bus) or an IEEE1394, a general-purpose network I/F such as Ethernet (registered trademark), a general-purpose near-distance wireless I/F such as wireless LAN (local area network) or Bluetooth (registered trademark) can be mentioned. In this embodiment, although the USB is adopted as the communication I/F 10, another type of I/F may be adopted instead thereof, or another type of I/F may be added thereto.

In this embodiment, as the configuration of the electronic music instrument, although the configuration of a keyboard is adopted, no limitation is made to this, and the configuration of a string instrument type, a wind instrument type, or a percussion instrument type may be adopted. Besides, the invention can be applied to not only the electronic music instrument, but also an electronic equipment such as a karaoke equipment, a game equipment or a communication equipment.

Figure 2:
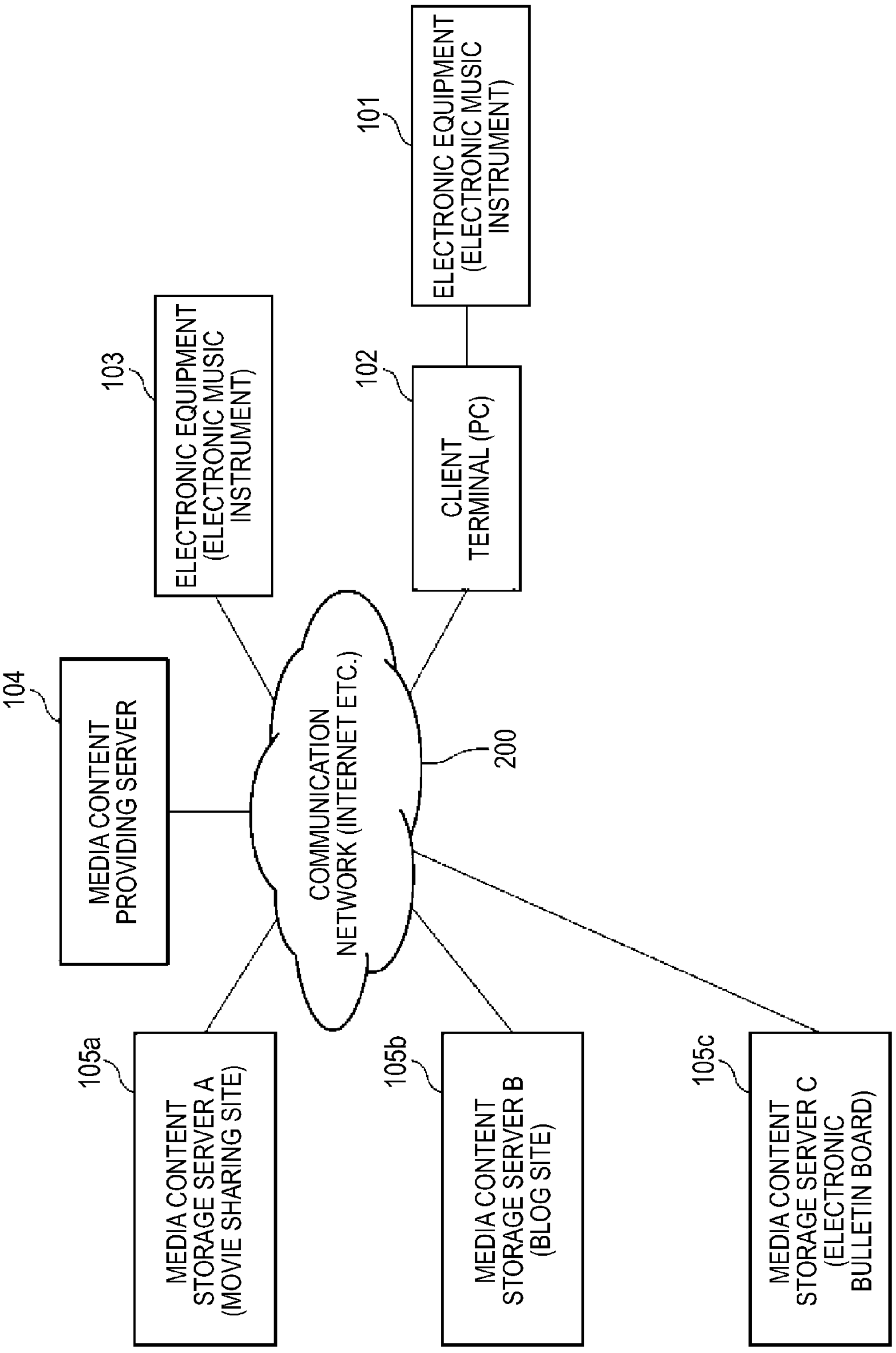
FIG. 2 is a view showing an example of a network structure.

FIG. 2 is a view showing an example of a network structure.

As shown in FIG. 2, a communication network 200 such as the Internet is connected with the client terminal 102, an electronic equipment 103 and four types of servers 104, 105*a* to 105*c*. The electronic music instrument 101 is connected to the client terminal 102 and is connected to the communication network 200 through the client terminal 102.

Since the client terminal 102 includes a PC (personal computer) in this embodiment, the structure of the client terminal is such that the playing operation unit 1, the setting operation unit 2, the detection circuits 3 and 4, the display unit 8, the sound source/effecting circuit 11 and the sound system 12 are removed from the structure of the electronic music instrument 101 of FIG. 1, and instead thereof, a keyboard, a mouse and a large display are added. As described later by use of FIG. 5, the client terminal 102 receives data transmitted by the electronic music instrument 101, transmits it to the media content providing server 104 after performing a specified process or without performing any process, and further singly transmits and receives various data to and from the media content providing server 104 without cooperation with the electronic music instrument 101.

In this embodiment, in response to an instruction from the client terminal 102 (the electronic music instrument 103 in a second embodiment described later), the media content providing server 104 circulates many media content storage servers (the three storage servers 105*a* to 105*c* in the illustrated example) connected to the communication network 200, collects information of media content relating to the electronic music instrument 101 (the electronic music instrument 103 in the second embodiment) from a lot of media contents stored in the respective media content storage servers, and provides it to the client terminal 102. When the user selects one of the information provided to the client terminal 102 and instructs acquisition thereof, the media content providing server 104 acquires media content data, which is instructed to be acquired, from the media content storage server storing it, and transmits it to the client terminal 102 (the electronic music instrument 103 in the second embodiment). Since it is not known when an access from the client terminal 102 to the media content providing server 104 is made, the media content providing server 104 always actuates (software to realize) a media content providing site, and prepares for the access from the client terminal 102 (the electronic music instrument 103 in the second embodiment) to the media content providing site.

The media content storage server A 105*a* provides so-called video sharing sites, registers movie data and performs streaming distribution or download distribution of the registered movie data. The media content storage server B 105*b* provides so-called blog sites, registers blogs, and opens the registered blogs to the public. The media content storage server C 105*c* provides so-called electronic bulletin boards, and various information can be written for respective themes and the written information can be browsed.

Each of the media content providing server 104 and the media content storage servers A to C 105*a* to 105*c* includes a normal server computer, and specifically, the structure is such that the playing operation unit 1, the setting operation unit 2, the detection circuits 3 and 4, the display unit 8, the sound source/effecting circuit 11 and the sound system 12 are removed from the structure of the electronic music instrument 101 of FIG. 1, and instead thereof, a keyboard, a mouse and a large display are added. Incidentally, in this embodiment, although each of the media content storage servers A to C 105*a* to 105*c* is constructed of one independent server computer, no limitation is made to this, and a part of or all of the sites are integrated and may be constructed of two or one server computer. Further, the function of the media content providing server 104 may also be included in the two or one server computer. Besides, the media content providing server 104 includes plural servers, and may be made to selectively take charge of one or two or more of the video sharing site, the blog site and the electronic bulletin board. Further, with respect to each of the video sharing site, the blog site and the electronic bulletin board, in this embodiment, although only one site exists on the communication network 200, this is merely for convenience, and normally, many sites exist.

The electronic music instrument 103 singly connects with the communication network 200 without through the client terminal 102, and transmits and receives data to and from the media content providing server 104. That is, in the electronic music instrument 103, the control processes executed by the electronic music instrument 101 and the client terminal 102 are integrated and are singly executed. Since the control process executed by the electronic music instrument 103 will be described in the second embodiment, hereinafter, in this embodiment, the electronic music instrument 103 is not mentioned.

Figure 3:
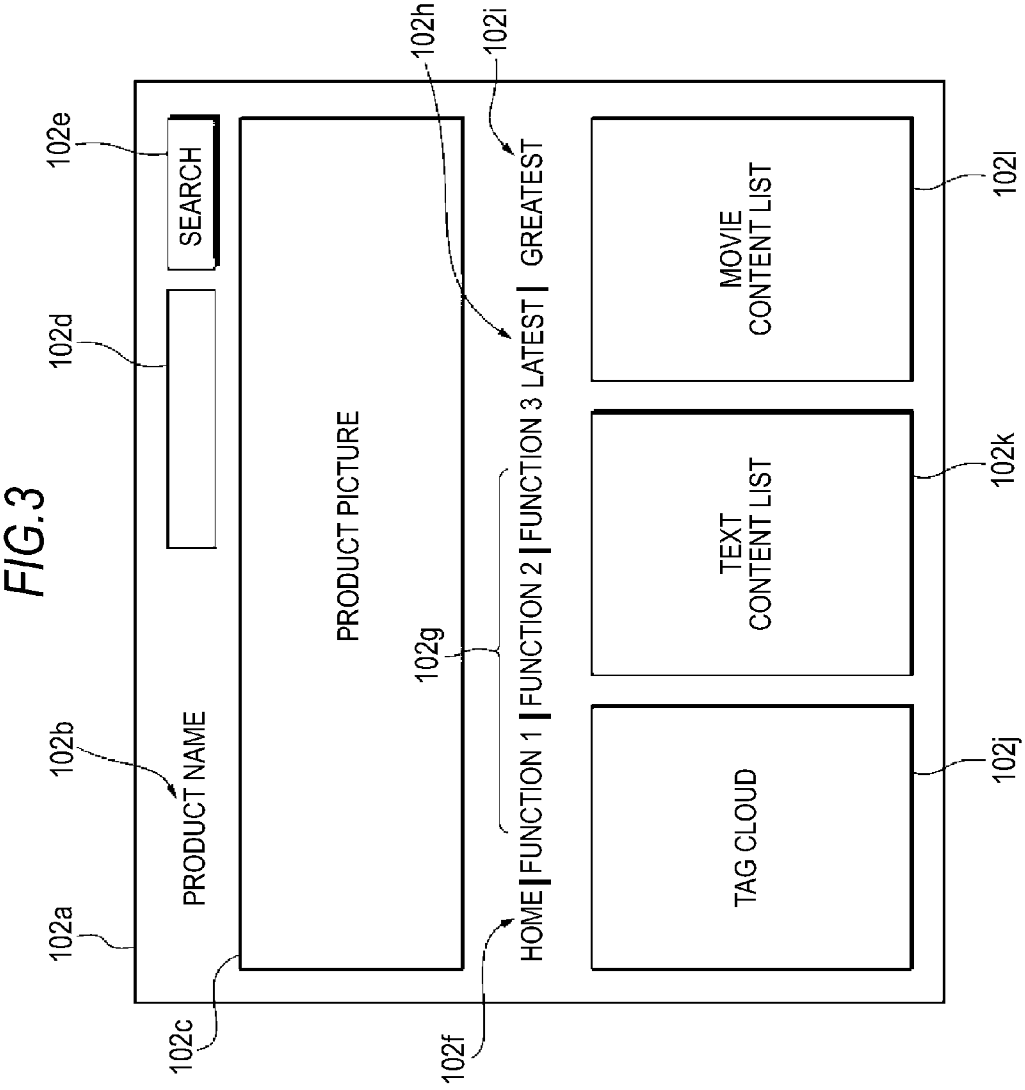
FIG. 3 is a view showing an example of a screen when a top page of a media content providing server is displayed on a display of a client terminal in FIG. 2.

When the client terminal 102 accesses the media content providing site (the site provided by the media content providing server 104), for example, a top page of the media content providing site is displayed on the (large) display of the client terminal 102. FIG. 3 is a view showing an example of a screen (hereinafter referred to as "top page screen") 102*a* when the top page of the media content providing site is displayed on the display of the client terminal 102.

The top page screen 102*a* is a dedicated screen for the electronic music instrument 101, and when the equipment connected to the client terminal 102 is changed from the electronic music instrument 101 to another equipment, the top page screen 102*a* is also changed to a dedicated screen for the another equipment. However, since it is not necessary to change a layout of the screen, only a display content (especially a content displayed in display areas 102*b*, 102*c* and 102*j* to 102*l* in the screen 102*a*) is changed. Of course, the layout or a design of the screen may also be changed.

The top page screen 102*a* includes the product name display area 102*b*, the product picture display area 102*c*, a search condition input frame 102*d*, a "Search" button 102*e*, a "Home" button 102*f*, a function (functions 1 to 3) button 102*g*, a "Latest" button 102*h*, a "Greatest" button 102*i*, the tag cloud display area 102*j*, the text content list display area 102*k*, and the movie content list display area 102*l*.

From a "product name" displayed in the product name display area 102*b* and a "product picture" displayed in the product picture display area 102*c*, the user can grasp that the provided media content relates to which electronic equipment. The dimension of the "product picture" may be "2D" or "3D". When the "2D" "product picture" is displayed, the "product picture" is merely a still picture. When the "3D" "product picture" is displayed, the user can rotate the "product picture" (for example, the side or the back can be seen) by operating the mouse or a joy stick. Incidentally, since the process of rotating the "product picture" is a well-known technique and is often used, its description will be omitted. Besides, the "2D" or "3D" "product picture" may be enlarged or contracted by the operation of the mouse or the like.

The search condition input frame 102*d* and the "Search" button 102*e* are used for inputting a search condition (search word) and for instructing the search under the inputted search condition when the user searches for desired media content. When the search under the inputted search condition is instructed, a list of media content ("text content list" and "movie content list" in the illustrated example) coincident with the search condition is displayed in a content list display area (the "text content list display area 102*k*" and the "movie content list display area 102*l*" in the illustrated example).

The "Home" button 102*f* and the button 102*g* of the functions 1 to 3 are used for the user to narrow the desired media content similarly to the search condition, and typical search conditions (functions provided in the electronic music instrument 101, for example, "style", "song", "voice", etc.) are assigned to the functions 1 to 3. The "Home" button 102*f* is for selecting "there is no search condition" (list of all media contents are displayed). Incidentally, it is preferable that the search conditions assigned to the functions 1 to 3 are changed according to the present operation state of the electronic music instrument 101.

The "Latest" button 102*h* and the "Greatest" button 102*i* are for specifying a priority order when outlines (for example, titles) of the respective media contents are arranged in the media content list. When the "Latest" button 102*h* is depressed, a list in which the newest media content is located at a higher rank is created, while when the "Greatest" button 102*i* is depressed, a list in which popular (well-browsed) media content is located at a higher rank is created.

A "tag cloud" displayed in the tag cloud display area 102*j* is such that tags (key words) (only one for duplicate tags)

attached to the respective media contents stored in the media content storage servers A to C 105_a_ to 105_c_ are arranged and are displayed like a cloud. Among the tags, a tag attached to a lot of contents are stressed and displayed (in a noticeable display mode, for example, a letter is made large or thick, or a color is made dense or bright), and a tag attached to a few contents are displayed without being stressed. Alternatively, a tag attached to media content the number of browsing times of which is large is stressed and displayed.

A "text content list" displayed in the text content list display area 102_k_ is a list of outlines (title, partial text, link, etc.) of text content collected from SNS sites, blog sites, electronic bulletin boards relating to electronic equipments and the like and relating to the electronic music instrument 101.

A "movie content list" displayed in the movie content list display area 102_l_ is a list of outlines (title, thumb nail of movie, link, etc.) of movie content collected from video sharing sites and the like and relating to the electronic music instrument 101.

Although the respective media contents typically include an impression of a user in the world who actually uses the electronic music instrument 101, a text such as How To or Tips, a movie in which the electronic music instrument 101 is operated or played, a movie to explain a function of the electronic music instrument 101 and the like, no limitation is made to these. A still image or a sound (audio) may be adopted. Incidentally, the respective media content lists (the "text content list" and the "movie content list" in the illustrated example) may be created by collecting information from only one media content storage server, or may be created by circulating plural media content storage servers to collect information and by mixing information from the plural servers.

The control process executed by the electronic music instrument 101, the client terminal 102, the media content providing server 104 and the media content storage servers A to C 105_a_ to 105_c_ will first be described in brief with reference to FIG. 4A, and next will be described in detail with reference to FIG. 5.

Figure 4A:
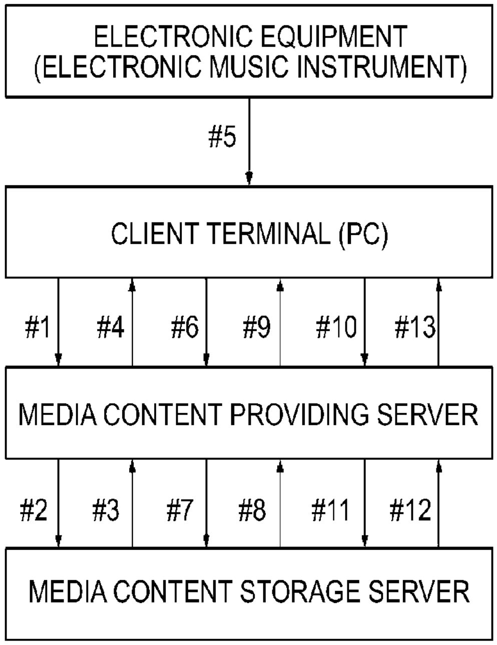
FIGS. 4A and 4B are views showing the flow of data between respective equipments on a communication network of FIG. 2.

FIG. 4A is a view showing the flow of data between the electronic music instrument 101, the client terminal 102, the media content providing server 104 and the media content storage servers A to C 105_a_ to 105_c_.

In FIG. 4A, first, when the client terminal 102 requests media content provision screen information (corresponding to, in FIG. 5, "top page display data" for displaying the top page screen 102_a_ of FIG. 3) relating to the electronic music instrument 101 to the media content providing server 104 (arrow #1), the media content providing server 104 requests information for forming the tag cloud relating to the electronic music instrument 101 and the media content list to the media content storage servers A to C 105_a_ to 105_c_ (arrow #2). In response to this, the media content storage servers A to C 105_a_ to 105_c_ transmit the information to the media content providing server 104 (arrow #3). The media content providing server 104 creates the tag cloud and the media content list based on the information from the media content storage servers A to C 105_a_ to 105_c_, creates something other than the tag cloud and the media content list based on information recorded in its own storage device, combines both to create the media content provision screen information relating to the electronic music instrument 101, and transmits the created media content provision screen information to the client terminal 102 (arrow #4). The client terminal 102 displays the received media content provision screen information on the display.

When the user operates one of operation units included in the playing operation unit 1 and the setting operation unit 2, and the operation state of the electronic music instrument 101 is changed, the electronic music instrument 101 transmits state data indicating the operation state after the change (arrow #5). The client terminal 102 receives the state data, and directly transmits it to the media content providing server 104 (arrow #6). The media content providing server 104 creates search condition data based on the received state data, and transmits the created search condition data to the media content storage servers A to C 105_a_ to 105_c_ (arrow #7). The respective media content storage servers A to C 105_a_ to 105_c_ return search results coincident with the search condition data (arrow #8).

The media content providing server 104 creates a media content list based on the received search results, rewrites the media content list in the media content provision screen information by this media content list, and transmits the rewritten media content provision screen information (corresponding to "search result display data" in FIG. 5) to the client terminal 102 (arrow #9). The client terminal 102 displays the received media content provision screen information. When the user selects (outline of) one of media contents from the displayed media content list, the client terminal 102 transmits acquisition request for actual data corresponding to the selected media content, that is, media content data to the media content providing server 104 (arrow #10). The media content providing server 104 accesses a server storing the media content data among the media content storage servers A to C 105_a_ to 105_c_ based on, for example, link information included in the received acquisition request (arrow #11). The accessed media content storage server reads the media content data from its own storage device, and transmits it to the media content providing server 104 (arrow #12). The media content providing server 104 receives the media content data, and directly transfers it to the client terminal 102 (arrow #13).

The client terminal 102 receives the media content data, and displays or reproduces it according to the type of the media content data.

As stated above, in this embodiment, when the user actually operates the electronic music instrument 101 and changes the operation state thereof, a list of media content relating to the electronic music instrument 101 and coincident with the present operation state of the electronic music instrument 101 among a lot of media contents stored in many media content storage servers on the communication network 200 is displayed on the display of the client terminal 102. When the user selects one of the media contents from the list, and instructs acquisition thereof, the media content data is acquired from the media content storage server storing it, and is automatically displayed or reproduced by the client terminal 102. Thus, the user can easily acquire the useful media content during the operation or playing of the electronic music instrument 101.

Next, this control process will be described in detail.

Figure 5:
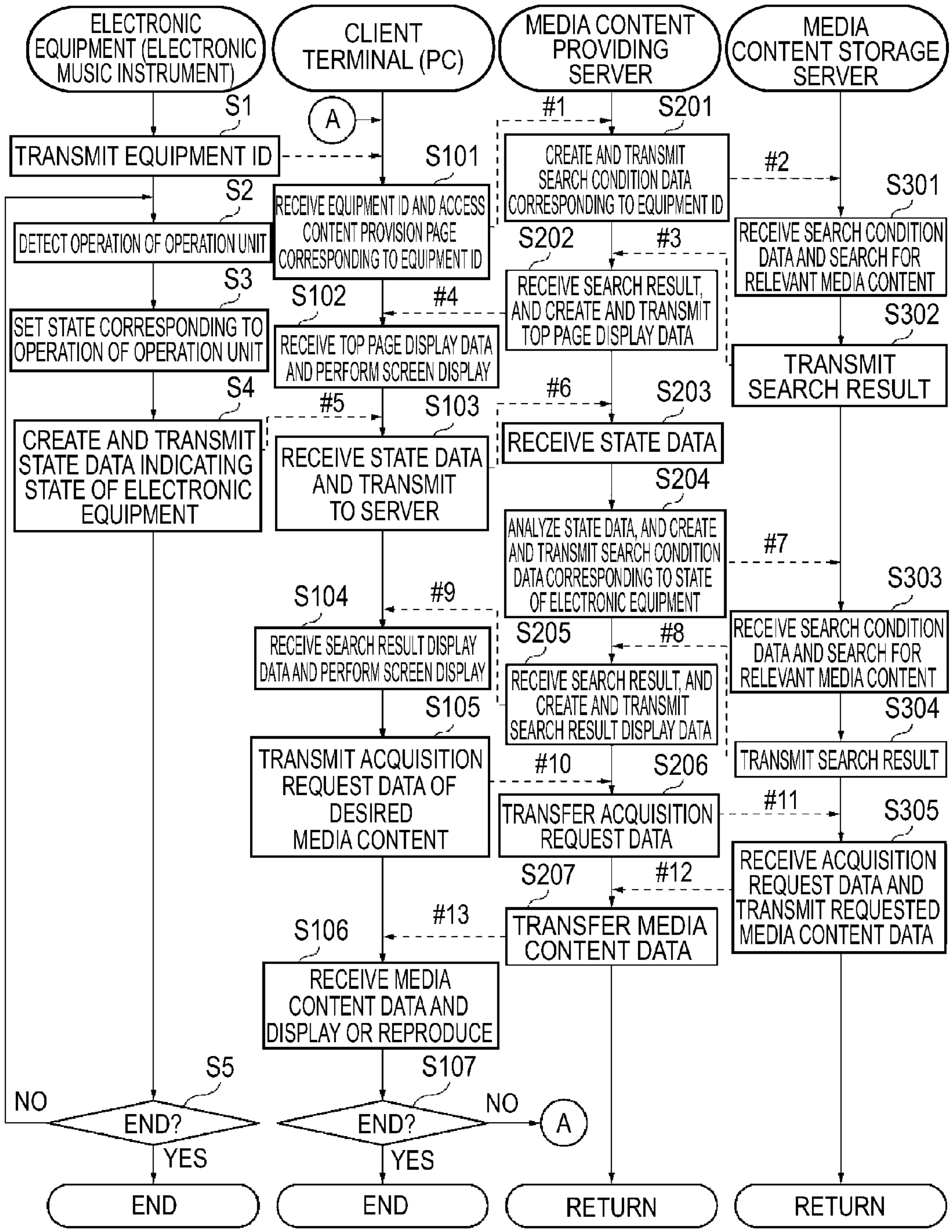
FIG. 5 is a flowchart showing a procedure of a control process cooperatively executed by respective equipments of the first embodiment of the invention.

FIG. 5 is a flowchart showing a procedure of a control process cooperatively executed by the electronic music instrument 101, the client terminal 102, the media content providing server 104, and the media content storage servers A to C 105_a_ to 105_c_. Incidentally, in the flowchart of FIG. 5, with respect to the control processes executed by the media content storage servers A to C 105_a_ to 105_c_, only the control process executed by one media content storage server is described. This is because anyone of the media content storage servers A to C 105_a_ to 105_c_ executes the same control process, it is sufficient if the procedure of the control process executed by any one of them is illustrated. Accordingly, actually, the respective media content storage servers A to C 105*a* to 105*c* execute the control process of the drawing in parallel. Besides, in the drawing, the control process executed by each of the electronic music instrument 101 and the client terminal 102 is terminated by "end", while the control process executed by each of the media content providing server 104 and the media content storage server is terminated by "return". This is for indicating that the "control process" of the drawing is one of many "control processes" executed by the server, since in each of the servers, various "control processes" are generally executed in addition to the "control process" of the drawing. Of course, actually, also in the electronic music instrument 101 and the client terminal 102, various "control processes" are executed in addition to the "control process" in the drawing. However, in the explanation of the invention, there is no problem even if the process of each of the equipments 101 and 102 is regarded as being completed by the "control process" in the drawing.

When the user depresses, for example, a power switch (not shown) included in the setting operation unit 2 of the electronic music instrument 101 and the power is supplied to the electronic music instrument 101, (the CPU 5 of) the electronic music instrument 101 starts a main routine, that is, the "control process" of the electronic music instrument 101 of FIG. 5. When the main routine is started, the electronic music instrument 101 first executes a not-shown initial setting process, and transmits its own electronic equipment ID to the client terminal 102 through the communication I/F 10 (step S1). It is needless to say that at this time, the power is supplied also to the client terminal 102, and the "control process" of the client terminal 102 of FIG. 5 is started. Incidentally, both the main routine of the electronic music instrument 101 and the "control process" of the client terminal 102 are ended when the user gives a specified end instruction (step S5→end, step S107→end).

The client terminal 102 receives this equipment ID, and accesses a content provision page corresponding to this equipment ID (step S101, #1). Here, "#n" (n is an integer of 1 to 13) corresponds to "#n" attached to the arrow of FIG. 4A (the same situation applies to that between FIG. 4B and FIG. 6). The storage device of the client terminal 102 previously stores a table in which equipment IDs of various electronic equipments are made to correspond to addresses (URL (uniform resource locator) on the Internet) of the content provision pages on the communication network 200. At step S101, the client terminal 102 refers to this table and accesses the objective content provision page. This table may be automatically installed when software of the "control process" of FIG. 5 executed by the client terminal 102 is installed to the client terminal 102, or may be acquired from the media content providing server 104 when the client terminal 102 first accesses the media content providing server 104 after starting the "control process".

When the client terminal 102 accesses the content provision page corresponding to the equipment ID, the media content providing server 104 creates the search condition data corresponding to the equipment ID, and transmits it to the respective media content storage servers A to C 105*a* to 105C (step S201, #2). Since the equipment ID is uniquely determined when the client terminal 102 accesses the content provision page corresponding to the equipment ID, the media content providing server 104 can create the search condition data corresponding to the equipment ID. Since the "search condition data" created here is used for displaying the top page of the content provision page, that is, the initial screen, it is preferable that a small number of search words are included so that search results in a wide range can be obtained. For example, only the "product name" of the electronic music instrument 101 is included. Incidentally, when the equipment ID is made coincident with the "product name", the equipment ID becomes the search condition and this is convenient.

The respective media content storage servers A to C 105*a* to 105*c* receive the search condition data, search their own storage devices for the relevant media content (step S301), and transmit search results to the media content providing server 104 (step S302, #3).

The media content providing server 104 receives the search results, creates top page display data based on the search results, and transmits the created top page display data to the client terminal 102 (step S202, #4). Here, the top page display data is data for displaying the top page screen 102*a* of FIG. 3. The search results are the base for displaying in the tag cloud display area 102*j*, the text content list display area 102*k* and the movie content list display area 102*l*. Accordingly, among display elements included in the top page display data, with respect to display elements to be displayed in the tag cloud display area 102*j*, the text content list display area 102*k* and the movie content list display area 102*l*, the media content providing server 104 creates them based on the search results, and with respect to display elements other than them, the media content providing server creates them based on data stored in its own storage device, and combines both to create the top page display data.

The client terminal 102 receives the top page display data, and displays it on the display (step S102). By this, the top page screen 102*a* is displayed on the display.

Next, the electronic music instrument 101 always monitors whether the user operates one of the operation units included in the playing operation unit 1 and the setting operation unit 2, and when the operation unit is operated, the electronic music instrument detects the operation of the operation unit (step S2). The electronic music instrument 101 sets the operation state to be a state corresponding to the operation of the detected operation unit (step S3). Further, the electronic music instrument 101 creates state data indicating the set operation state, and transmits it to the client terminal 102 (step S4, #5). The operation state (including the inner state) of the electronic music instrument 101 is changed according to the operation of the operation unit (the display content of the screen is changed, or the operation mode is changed), and the state data expresses the operation state after the change in a specified data format. Specifically, as the specified data format, for example, when text data is adopted, and when the operation mode is changed from "play mode" to "reproduction mode", a text file written as "operation mode: reproduction mode" is created. When a volume operation unit is operated while the operation mode remains "play mode", and a volume value is changed from "5" to "10", a text file written as "operation mode: play mode; volume value: 10" is created.

The client terminal 102 receives the state data from the electronic music instrument 101, and directly transmits it to the media content providing server 104 (step S103, #6). The media content providing server 104 receives the state data, and stores it in, for example, a state data storage area (not shown) secured in its own RAM (step S203). In the RAM, an old state data storage area (not shown) for storing the state data received previously is also secured. Accordingly, when effective state data is already stored in the state data storage area, and when new state data is received and the state data in the state data storage area is updated, the media content providing server 104 reads the state data in the state data storage area, stores it in the old state data storage area, and overwrites the state data storage area by the new state data.

Next, the media content providing server 104 analyzes the state data stored in the state data storage area, creates the search condition data corresponding to the operation state of the electronic music instrument 101, and transmits it to the respective media content storage servers A to C 105*a* to 105*c* (step S204, #7). Here, when the search condition data is created, and when the effective old state data (state data received previously) is stored in the old state data storage area, the media content providing server 104 calculates a difference between the new state data and the old state data, determines, based on the difference, how the state of the electronic music instrument 101 is changed, that is, what operation is performed by the user, and creates the search condition data according to a determination result. Specifically, when the old state data is "operation mode: play mode", and the new state data is "operation mode: reproduction mode", since the difference is calculated as "reproduction mode—play mode", it is determined that the operation mode is changed from the "play mode" to the "reproduction mode", that is, the user performs the operation to change the operation mode. On the other hand, when the old state data is "operation mode: play mode; volume value: 5", and the new state data is "operation mode: play mode; volume value: 10", since the difference is calculated as "volume value: 5", it is determined that the operation mode is not changed, and the "volume value" is increased by "5", that is, the user does not change the operation mode, and operates a volume operation unit in an increasing direction by "5". As a result, in the former specific example, for example, "search condition data" including search words of "reproduction mode" and "mode transition from play mode to reproduction mode" is created, and in the latter specific example, for example, "search condition data" including search words of "play mode" and "operation of volume operation unit" is created.

The respective media content storage servers A to C 105*a* to 105*c* receive the search condition data by the same process as the process of steps S301 and S302, search their own storage devices for the relevant media content (step S303), and transmit search results to the media content providing server 104 (step S304, #8).

The media content providing server 104 receives the search results, creates search result display data based on the search results, and transmits the created search result display data to the client terminal 102 (step S205, #9). Here, the search result display data is different from the top page display data of step S202 mainly in the content displayed in the tag cloud display area 102*j*, the text content list display area 102*k* and the movie content list display area 102*l*, and the other display content is almost the same. The "search result" of step S304 is the base for displaying in the tag cloud display area 102*j*, the text content list display area 102*k* and the movie content list display area 102*l* similarly to the "search result" of step S302. Accordingly, at step S205, the media content providing server 104 creates the search result display data by replacing the respective display elements to be displayed in the tag cloud display area 102*j*, the text content list display area 102*k*, and the movie content list display area 102*l* among the display elements included in the top page display data by respective display elements created based on the "search result" of step S304.

The client terminal 102 receives the search result display data, and displays it on its own display (step S104). By this, a similar screen to the top page screen 102*a* of FIG. 3 is displayed on the display although the respective displays of the tag cloud display area 102*j*, the text content list display area 102*k* and the movie content list display area 102*l* are updated.

When the user selects an outline (for example, a title) of desired media content, that is, the media content desired to be acquired from the search result displayed on the display, the client terminal 102 transmits acquisition request data for acquiring the media content data to the media content providing server 104 (step S105, #10). The media content providing server 104 transfers the acquisition request data to the media content storage server storing the media content among the media content storage servers A to C 105*a* to 105*c* (step S206, #11). At this time, since the media content providing server 104 merely functions to relay the acquisition request data from the client terminal 102 to one of the media content storage servers A to C 105*a* to 105*c*, the client terminal 102 may directly transmit the acquisition request data to one of the media content storage servers A to C 105*a* to 105*c* without through the media content providing server 104.

The media content storage server receiving the acquisition request data reads the media content data stored in its own storage device, and transmits it to the media content providing server 104 (step S305, #12). The media content providing server 104 receives the media content data, and directly transfers it to the client terminal 102 (step S207, #13). At this time, since the media content providing server 104 merely functions to relay the media content data from the media content storage server to the client terminal 102, the media content storage server may directly transmit the media content data to the client terminal 102 without through the media content providing server 104.

The client terminal 102 receives the media content data from the media content providing server 104, and displays or reproduces it according to the type of the media content data.

Next, a second embodiment of the invention will be described.

This embodiment is different from the first embodiment in that the control processes executed by the electronic music instrument 101 and the client terminal 102 are combined, and are executed by only the electronic music instrument 103. Accordingly, as the hardware of the electronic music instrument 103, the hardware of the electronic music instrument 101, that is, the hardware of FIG. 1 is used as it is. However, although the display unit 8 is constructed of the small LCD in the electronic music instrument 101, the top page screen 102*a* of FIG. 3 is considerably large and is difficult to be displayed on the small LCD. Thus, it is preferable to adopt an LCD having such a size that the screen 102*a* can be easily displayed. Besides, as the communication I/F 10, although the USB is adopted in the first embodiment, this can not be connected to the communication network 200. Thus, it is necessary to adopt a communication I/F connectable to the communication network 200. Incidentally, as the hardware of the media content providing server 104 and the media content storage servers A to C 105*a* to 105*c*, those described in the first embodiment may be used as they are.

Figure 4B:
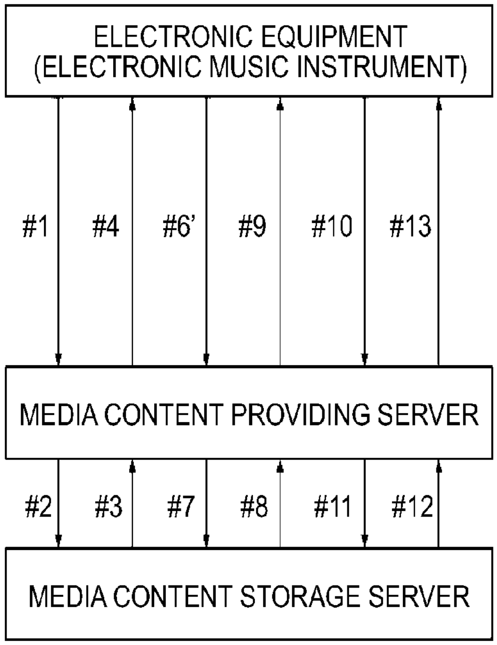

FIG. 4B is a view showing the flow of data between the electronic music instrument 103, the media content providing server 104 and the media content storage servers A to C 105*a* to 105*c*. As is understood from the comparison between FIG. 4B and FIG. 4A, FIG. 4B is constructed such that the arrow #5 of FIG. 4A is deleted, and the arrow #6 is changed to an arrow #6'. However, in the respective processes of #1 to #4 and #7 to #13 in this embodiment, it is necessary to replace the "client terminal 102" in the respective processes of #1 to #4 and #7 to #13 in the first embodiment by the "electronic music instrument 103". Then, instead of the process of #6 in the first embodiment, a process of #6' is performed as follows: when the user operates one of operation units included in the playing operation unit 1 and the setting operation unit 2 so that the operation state of the electronic music instrument 103 is changed, the electronic music instrument 103 transmits state data indicating the operation state after the change to the media content providing server 104.

Figure 6:
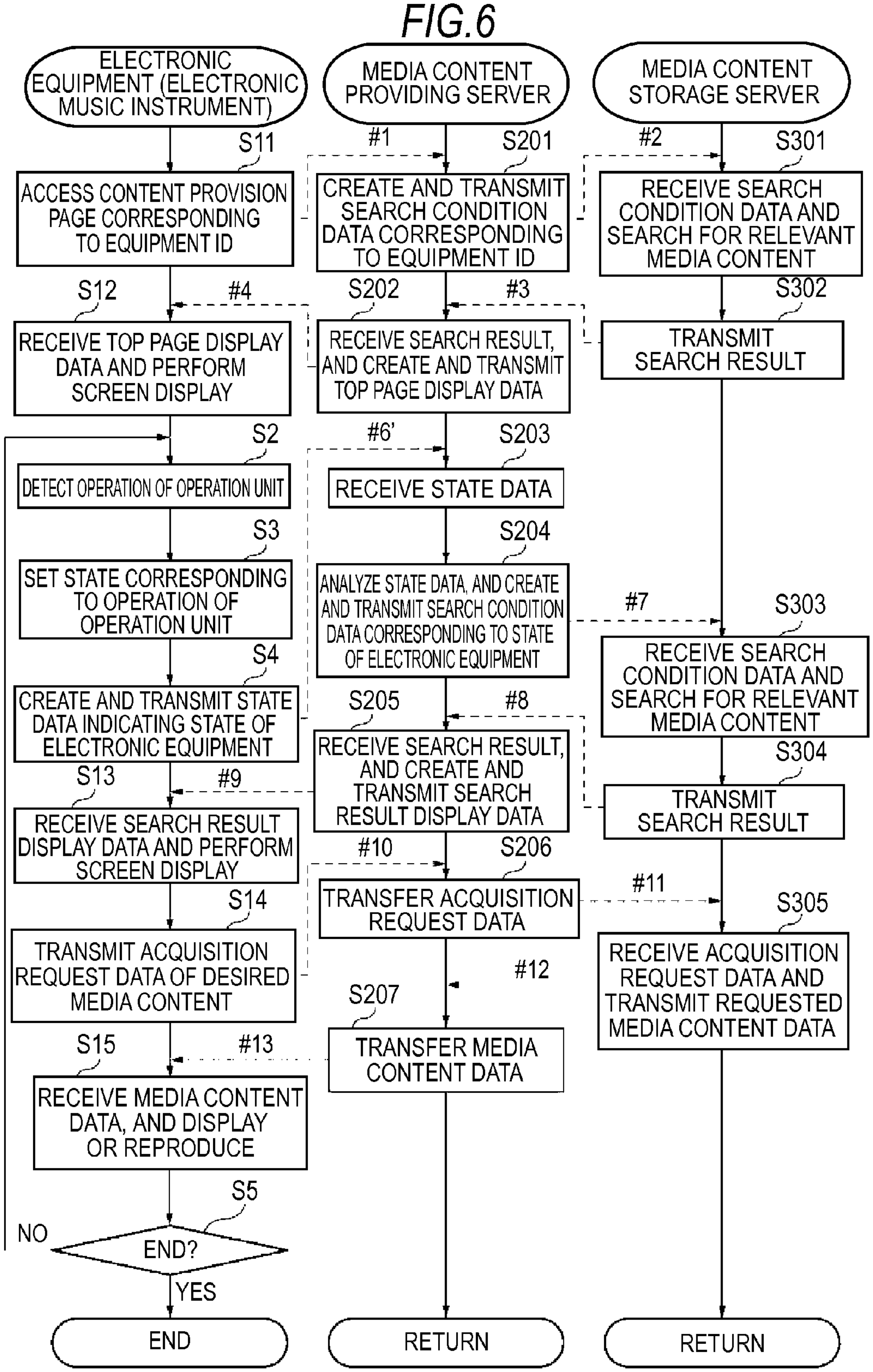
FIG. 6 is a flowchart showing a procedure of a control process cooperatively executed by respective equipments of a second embodiment of the invention.

FIG. 6 is a flowchart showing the procedure of the control process executed cooperatively by the media content providing server 104 and the media content storage servers A to C 105*a* to 105*c*. In FIG. 6, a step of performing the same process as the process in FIG. 5 is denoted by the same step number. Steps S11, S12, S13, S14, and S15 respectively correspond to steps S101, S102, S104, S105, and S106 of FIG. 5.

As is understood from the comparison between FIG. 6 and FIG. 5, the control process of the electronic music instrument 103 in FIG. 6 is constructed by combining the respective control processes of the electronic music instrument 101 and the client terminal 102 of FIG. 5. As stated above, since the control process of FIG. 6 can be easily inferred from the control process of FIG. 5, the detailed explanation of the control process of FIG. 6 is omitted. However, when the user operates either one of the operation units in the state where the content provision page corresponding to the electronic music instrument 103 is displayed, there is a case where the display content on the LCD is changed according to the operation of the operation unit (the display screen is changed to one corresponding to the operation state). In this case, since the content provision page (the top page screen or the search result display screen as the display result of the search result display data) during display is changed to a screen different from the intention of the user, the user feels rather uncomfortable. Then, it is preferable to devise as follows:

(A) a mode is prepared in which the screen of the content provision page is fixed (even if the operation of an operation unit is performed, the screen is not changed to one corresponding to the operation state);

(B) a dedicated display unit for displaying the content provision page is prepared; or (C) a dedicated operation unit for displaying the content provision page is prepared, and after the screen is changed to one corresponding to the operation state by the operation of any operation unit, the screen is immediately changed to the screen of the content provision page by the operation of the dedicated operation unit.

Incidentally, it is needless to say that the object of the invention can be achieved also when a storage medium recording a program code of software to realize the functions of the respective embodiments is supplied to a system or an apparatus, and a computer (or CPU or MPU) of the system or the apparatus reads and executes the program code stored in the storage medium.

In this case, the program code itself read from the storage medium realizes the novel functions of the invention, and the program code and the storage medium recording the program code constitute the invention.

As the storage medium for supplying the program code, for example, a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM or the like can be used. Besides, the program code may be supplied from a server computer through a communication network.

Besides, it is needless to say that the invention includes not only a case where the functions of the respective embodiments are realized by executing the program code read by the computer, but also a case where the OS working on the computer performs a part of or all of the actual process based on the instruction of the program code, and the functions of the respective embodiments are realized by the process.

Further, it is needless to say that the invention includes a case where after the program code read from the storage medium is written in a memory provided in a feature expansion board inserted in the computer or a feature expansion unit connected to the computer, a CPU or the like provided in the feature expansion board or the feature expansion unit performs a part of or all of the actual process based on the instruction of the program code, and the functions of the respective embodiment are realized by the process.

What is claimed is:

1. A terminal apparatus communicable with an electronic equipment, a media content providing server, and a plurality of media content storage sites, the terminal apparatus comprising:

a display device;

a first communication interface configured to connect with the electronic equipment;

a second communication interface configured to connect with the media content providing server and the plurality of media content storage sites through a communication network; and a microprocessor configured to execute:

a first acquisition task that acquires specific information specifying the electronic equipment from the electronic equipment;

a second acquisition task that acquires state information indicating an operation state of the electronic equipment from the electronic equipment;

a third acquisition task that acquires a list of media content relating to the electronic equipment from the plurality of media content storage sites existing on the communication network as directed by the media content providing server, in response to transmission of the specific information acquired by the first acquisition task and the state information acquired by the second acquisition task to the media content providing server;

a display task that displays the list of the media content acquired by the third acquisition task on the display device; and a fourth acquisition task that acquires media content based a user instruction from the list of the media content displayed on the display device, from a site storing the media content among the plurality of media content storage sites.

2. An electronic equipment communicable with a media content providing server and a plurality of media content storage sites, the electronic equipment comprising:

a display device;

a communication interface configured to connect with the media content providing server and the plurality of media content storage sites through a communication network; and a microprocessor configured to execute:

a first acquisition task that acquires a list of media content relating to the electronic equipment, from the plurality of media content storage sites existing on the communication network as directed by the media content providing server, in response to transmission of specific information specifying the electronic equipment and state information indicating an operation state of the electronic equipment to the media content providing server;

a display task that displays the list of the media content acquired by the first acquisition task on the display device; and a second acquisition task that acquires media content based on a user instruction from the list of the media content displayed on the display device, from a site storing the media content among the plurality of media content storage sites.

3. A non-transitory computer-readable storage medium storing a computer program executable by a microprocessor of a terminal apparatus that is communicable with an electronic equipment, a media content providing server, and a plurality of media content storage sites, to execute a method comprising:

a first acquisition step of acquiring specific information specifying the electronic equipment from the electronic equipment connected via a first communication interface;

a second acquisition step of acquiring state information indicating an operation state of the electronic equipment from the connected electronic equipment;

a third acquisition step of acquiring a list of media content relating to the electronic equipment from the plurality of media content storage sites existing on a communication network as directed by the media content providing server, in response to transmission of the specific information acquired in the first acquisition step and the state information acquired in the second acquisition step to the media content providing server connected via a second communication interface through the communication network;

a display step of displaying the list of the media content acquired in the third acquisition step on a display device; and a fourth acquisition step of acquiring media content based on a user from the list of the media content displayed on the display device, from a site storing the media content among the plurality of media content storage sites.

4. A non-transitory computer-readable storage medium storing a computer program executable by a microprocessor of an electronic equipment that is communicable with a media content providing server and a plurality of media content storage sites, to execute a method comprising:

a first acquisition of acquiring a list of media content relating to the electronic equipment from the plurality of media content storage sites existing on a communication network as directed by the media content providing server, in response to transmission of specific information specifying the electronic equipment and state information indicating an operation state of the electronic equipment to the media content providing server connected via a communication interface through the communication network;

a display step of displaying the list of the media content acquired in the first acquisition step on a display device; and a second acquisition step of acquiring media content based on a user from the list of the media content displayed on the display device, from a site storing the media content among the plurality of media content storage sites.

* * * * *